United States Patent
Dhakshanamoorthy et al.

(10) Patent No.: US 8,406,395 B2
(45) Date of Patent: Mar. 26, 2013

(54) SYSTEM AND METHOD FOR IDENTIFYING TELECOM USERS BASED ON CALL USAGE PATTERNS

(75) Inventors: Lakshmidevi Dhakshanamoorthy, Chennai (IN); Girish Venkateswaran, Chennai (IN); Subha Sethumadhavan, Chennai (IN)

(73) Assignee: Infosys Limited, Bangalore (IN)

( * ) Notice: Subject to any disclaimer, the term of this patent is extended or adjusted under 35 U.S.C. 154(b) by 131 days.

(21) Appl. No.: 13/111,390

(22) Filed: May 19, 2011

(65) Prior Publication Data
US 2012/0257736 A1  Oct. 11, 2012

(30) Foreign Application Priority Data
Apr. 7, 2011  (IN) .............. 1201/CHE/2011

(51) Int. Cl.
*H04M 15/00* (2006.01)
(52) U.S. Cl. ............... 379/111; 379/112.01; 379/133; 705/14.25; 705/14.54
(58) Field of Classification Search .......... 379/111, 379/112.01, 133, 134, 137, 139; 705/52, 705/7.29, 7.31, 14.25, 14.27, 14.53, 14.54, 705/26.35
See application file for complete search history.

(56) References Cited

U.S. PATENT DOCUMENTS

| | | | |
|---|---|---|---|
| 2006/0212900 A1* | 9/2006 | Ismail et al. | 725/34 |
| 2010/0100618 A1* | 4/2010 | Kuhlke et al. | 709/224 |
| 2010/0310055 A1* | 12/2010 | Boatwright | 379/32.01 |

* cited by examiner

*Primary Examiner* — Binh Tieu
(74) *Attorney, Agent, or Firm* — Marc S. Kaufman; Stephen M. Hertzler; Reed Smith LLP

(57) ABSTRACT

The disclosed embodiment relates to identifying telecom users. An exemplary method comprises collecting, with a computing device, call usage data based on the call usage of a new telecom user, comparing, with a computing device, the collected call usage data with existing call usage data stored within a call usage database to determine if the collected call usage data for the new telecom user corresponds with the existing call usage data for an existing telecom user, assigning the new telecom user a user identifier corresponding to the existing telecom user if it is determined that the collected call usage data for the new telecom user corresponds with the existing call usage data for an existing telecom user, and assigning the new telecom user a new user identifier if it is determined that the collected call usage data for the new telecom user does not correspond with the existing call usage data for an existing telecom user. The disclosed embodiment also relates to a system and computer-readable code that can be used to implement the exemplary methods.

18 Claims, 2 Drawing Sheets

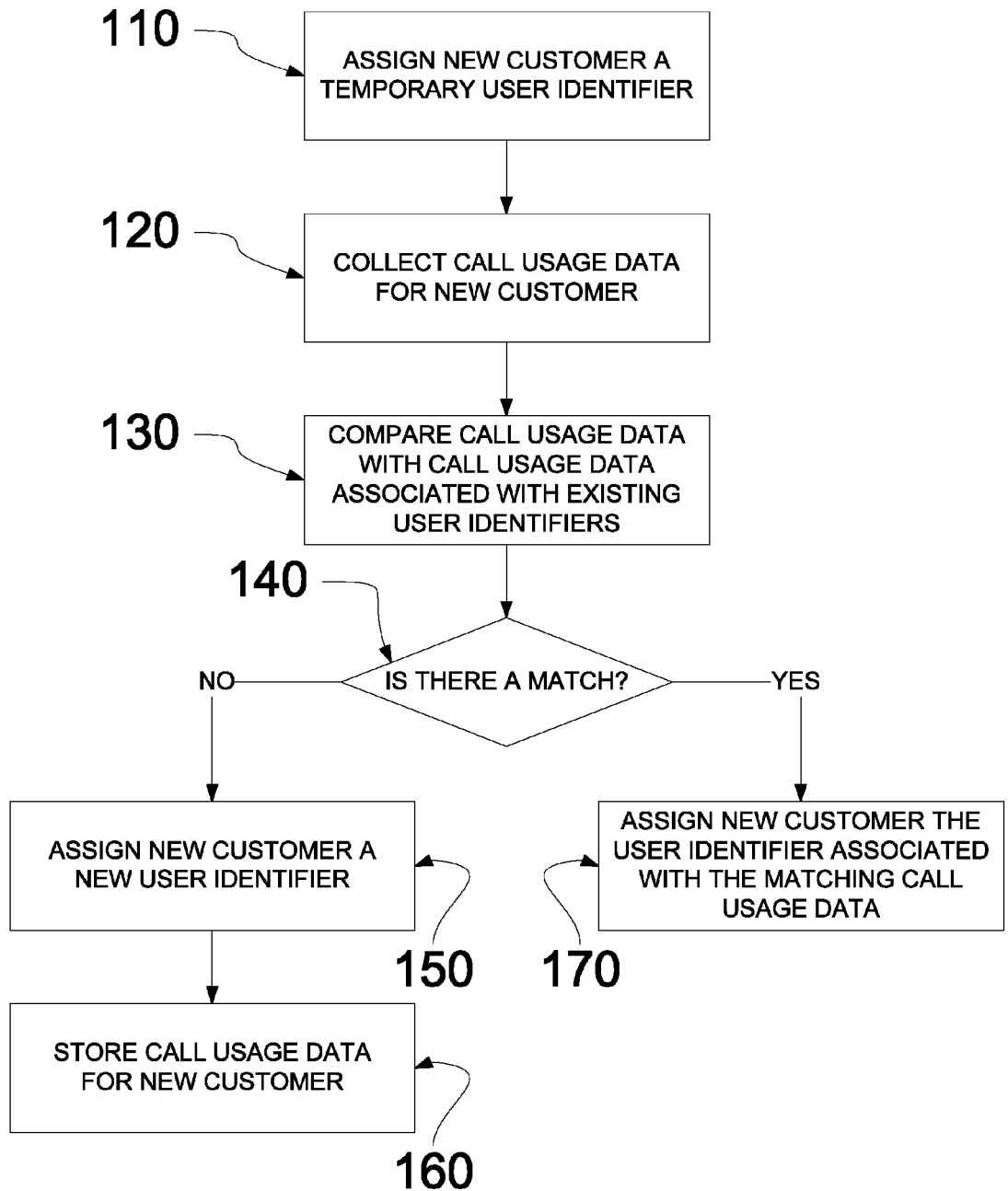

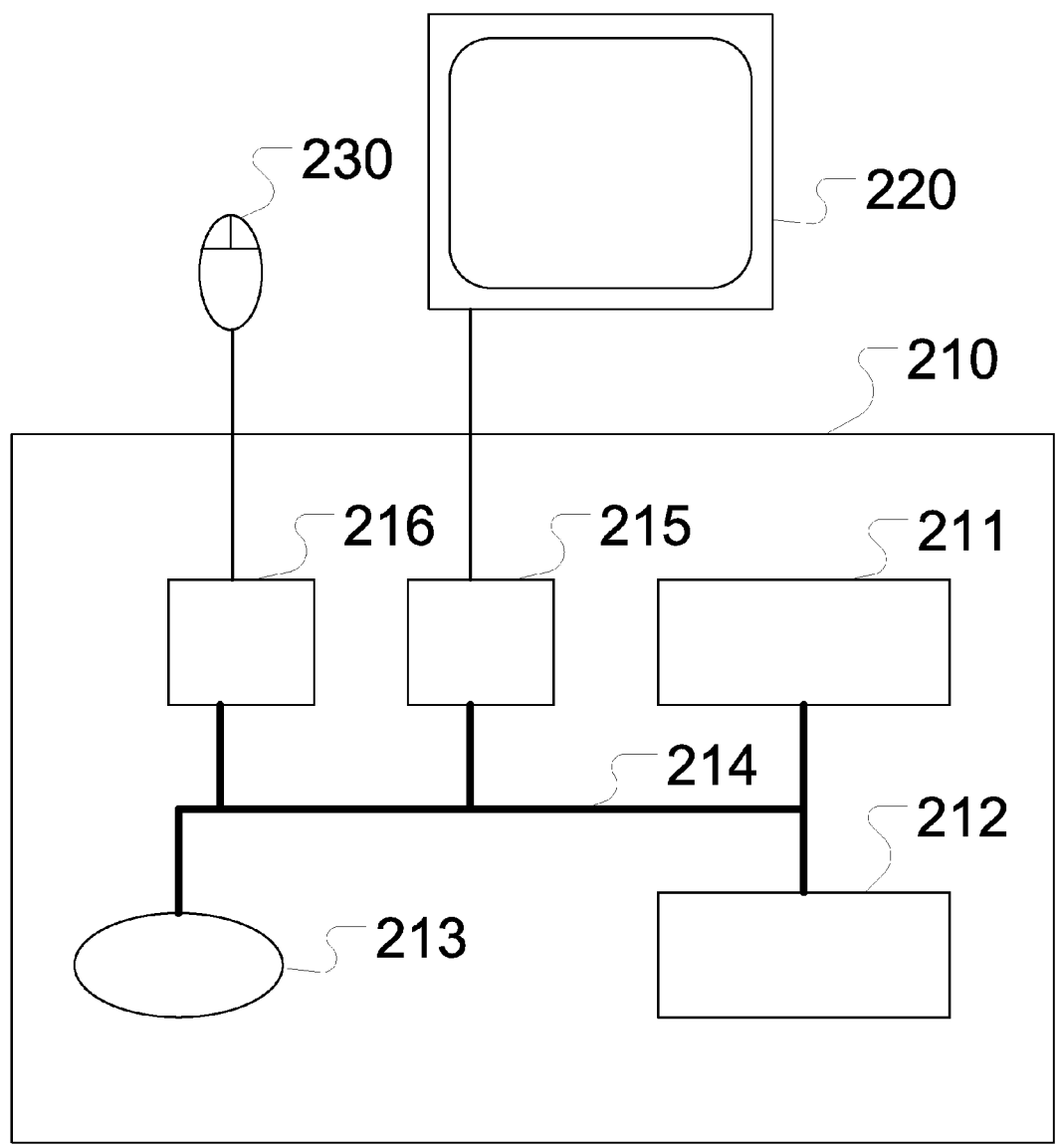

SYSTEM AND METHOD FOR IDENTIFYING TELECOM USERS BASED ON CALL USAGE PATTERNS

RELATED CASE INFORMATION

This application claims priority to Indian Patent Application No. 1201/CHE/2011, filed Apr. 7, 2011, the entire disclosure of which is hereby incorporated by reference in its entirety.

FIELD OF THE INVENTION

The invention relates to a system and method for identifying telecom users. Specifically, the disclosed embodiment relates to identifying telecom users based on call usage patterns.

BACKGROUND

Telecom companies, such as service providers, (including telcos, MSOs, etc.) spend significant resources on understanding their customers, campaigning for new customers, and providing promotions to retain customers. When a customer rejoins after an absence, telecom companies generally restart the customer engagement process as they are unaware of pre-existence of the rejoined customer data. Under prepaid arrangements, customers frequently take advantage of this oversight by quitting and then rejoining to take advantage of new customer promotions, which increases the campaign cost for telecom companies.

Under existing systems, when a customer registers for the service, telecom companies expend significant resources to collect customer related information. When the customer leaves the service, the telecom companies either archive the collected information or purge it. If the same customer rejoins at a later time, telecom companies typically consider them to be a new customer, and restart collecting their information without using previously existing data because they are unable to track and map the rejoined customer with his archived information. Under pre-paid arrangements, the issue is worse as the telecom companies get significantly less, and potentially incorrect, information when a customer enrolls, and they spend relatively more to get customer's information.

In summary, telecom companies have no pragmatic way to track and match rejoined customers with their archived information. This includes, but is not limited to, typical scenarios such as prepaid customers turning into postpaid, prepaid customers taking a new prepaid connection, postpaid customer moving to different geographies within the same country, and the like. This leads to indirect revenue leakage to telecom companies in terms of repeat customer engagement process.

SUMMARY

The disclosed embodiment relates to a system and method for identifying telecom users. The method preferably comprises collecting, with a computing device, call usage data based on the call usage of a new telecom user, comparing, with a computing device, the collected call usage data with existing call usage data stored within a call usage database to determine if the collected call usage data for the new telecom user corresponds with the existing call usage data for an existing telecom user, assigning the new telecom user a user identifier corresponding to the existing telecom user if it is determined that the collected call usage data for the new telecom user corresponds with the existing call usage data for an existing telecom user, and assigning the new telecom user a new user identifier if it is determined that the collected call usage data for the new telecom user does not correspond with the existing call usage data for an existing telecom user.

The disclosed embodiment further relates to a system for identifying telecom users. The system preferably comprises a computing device configured to collect call usage data based on the call usage of a new telecom user, a computing device configured to compare the collected call usage data with existing call usage data stored within a call usage database to determine if the collected call usage data for the new telecom user corresponds with the existing call usage data for an existing telecom user, a computing device configured to assign the new telecom user a user identifier corresponding to the existing telecom user if it is determined that the collected call usage data for the new telecom user corresponds with the existing call usage data for an existing telecom user, and a computing device configured to assign the new telecom user a new user identifier if it is determined that the collected call usage data for the new telecom user does not correspond with the existing call usage data for an existing telecom user.

The disclosed embodiment also relates to computer-readable code stored on a computer-readable medium that, when executed by a processor, performs a method for identifying telecom users. The method preferably comprises collecting, with a computing device, call usage data based on the call usage of a new telecom user, comparing, with a computing device, the collected call usage data with existing call usage data stored within a call usage database to determine if the collected call usage data for the new telecom user corresponds with the existing call usage data for an existing telecom user, assigning the new telecom user a user identifier corresponding to the existing telecom user if it is determined that the collected call usage data for the new telecom user corresponds with the existing call usage data for an existing telecom user, and assigning the new telecom user a new user identifier if it is determined that the collected call usage data for the new telecom user does not correspond with the existing call usage data for an existing telecom user.

The call usage data may include information such as geographic location of callers, telephone numbers called, identity of callers, call frequencies, call durations, what time of day calls were made, what days of the week calls were made, number of calls made over a period of time, and the like. In addition, the call usage data may be filtered to remove extraneous usage data.

BRIEF DESCRIPTION OF THE DRAWINGS

FIG. 1 is a flow chart of an exemplary method according to the disclosed embodiment.

FIG. 2 illustrates an exemplary computing device useful for implementing systems and performing methods disclosed herein.

DETAILED DESCRIPTION

As described herein, the disclosed embodiments relate to the use of unique signatures for telecom customers based on call usage patterns, thereby enabling telecom companies to track and differentiate rejoined customers from the real new customers and prevent indirect revenue leakage. This utility enables telecom companies to save substantial resources and report accurate counts of new and rejoined customers at any given point of time. Advantages of accurately identifying new users as former or returning customers include, for example, avoiding fraudulence, reducing campaign costs, obtaining more accurate statistics regarding of newly added subscribers and returning customers, and furthering the telecom company's understanding of customer social networking patterns.

The disclosed embodiments utilize patterns within customer call usage data to create a distinct signature for every customer. Analyzing unique subscriber call usage data helps telecom companies identify the rejoined customers, thereby reducing cost of processes involved in understanding and engaging them again. This also enables providing accurate statistics in terms of new customers, existing customers and switched customers. While telecom companies may currently analyze the call usage behavior of customers for various analytics, this data isn't used as the basis for creating unique customer signatures for identifying the rejoined customers and thereby reduce the campaign cost.

Call usage can be an accurate user identifier because no two people will have identical call patterns. Thus, call usage statistics are a viable tool for identifying the uniqueness of an individual customer or subscriber. However, it is important to note that a single subscriber's call usage will not always be consistent (e.g. a subscriber's personal call pattern may remain same over a period whereas his official calls might get changed when he changes his office or his official contacts changes). For this reason, data should be collected and analyzed over a sufficient period of time to establish the user's identity.

The methods and systems disclosed herein are applicable to many types of customer relationships with telecom companies. For example, in traditional, post-paid, arrangements, the disclosed embodiment creates a unique identifier for each customer, which could be used for customer engagement and reduce campaign cost. In pre-paid arrangements, in addition to reducing campaign cost, the disclosed embodiment addresses the problem of having significantly less customer demographics information compared to post-paid arrangements. Finally, when reporting key performance indicators, the disclosed embodiment enable increased reporting accuracy regarding acquired, existing, and switched customers.

Because telecom companies are typically focused on aggressive campaigning and providing bountiful promotions to new customers in order to succeed in a highly competitive environment, the importance of identifying rejoined customers is overlooked, resulting in revenue leakage. This leakage can be reduced and eliminated by identifying rejoined customers quickly and efficiently by using call usage data, thereby reducing the campaign cost.

FIG. 1 is a flow chart of an exemplary method according to the disclosed embodiment. In step 110, after communications are started between the telecom company and a new customer, the new customer is assigned a temporary user identifier. The new customer is preferably identified using this temporary user identifier until either a new permanent user identifier is assigned, or until the new customer is matched with an existing user identifier. Any type of suitable temporary user identifier may be used. Note that the new customer may either be an actual new telecom user or a former customer that may be returning for any of a variety of reasons.

In step 120, call usage data for the new customer is collected. This call usage data can include data including, but not limited to, call locations (for example, originating and/or destination area codes), called numbers, duration of the calls, time the calls were made/completed, numbers calls were received from, duration of the calls, time the calls were received/completed, patterns of calls on weekdays and/or weekend, call history summaries (for example, number of calls made in a hour, day, week, month, week day, week end, etc.), and the like. Any call usage data may be collected. Call usage data can be collected for any period of time sufficient to establish a pattern, for example, 2-3 weeks.

In step 130, the collected call usage data is compared with existing call usage data stored within a call usage database to determine if the collected call usage data for the new telecom user corresponds with the existing call usage data for an existing telecom user. The call usage database preferably includes call usage data for all existing and former telecom customers and tracks call behavior and statistics for all existing users. By collecting and storing this data, the call usage database provides a comprehensive collection of call usage data and user identifiers for existing and former telecom users, thereby optimizing the chances that the comparison between the new telecom user's collected call usage data will result in a match.

The comparison between the collected call usage data of the new telecom user and data stored within the call usage database can be carried out using any known analysis or data mining techniques. Exemplary data mining or pattern matching techniques include unsupervised learning algorithms, association rules, clustering, pattern recognition, and the like. Suitable algorithms are preferably built into data mining tools for use in this process, and have the intelligence to correctly identify specific users despite variations in call usage by filtering out call usage data that may not otherwise fit the primary call patterns and completing the analysis using subsets of the call usage data. It is also preferable for suitable algorithms to be refined periodically or on a continuous basis to better analyze the collected call usage data.

The call usage data is preferably stored in a manner that allows the data to be analyzed to derive data structures that can be used to identify the uniqueness the subscribers. For example, the data structures preferably include the above exemplary types of call usage data, and my also include metadata relevant to the devices or services offered by the service providers and/or used by the user. Any type of call usage data or call usage related data may be utilized for this purpose. The data structure also preferably includes header and trailer information.

In step 150, if it is determined that the collected call usage data for the new telecom user does not correspond (i.e. match) with the existing call usage data for an existing telecom user, the new telecom user is assigned a new user identifier. This finding indicates that the user is actually a new customer, and not simply a returning customer. This new user identifier is preferably a unique, permanent user identifier that will associated only with the new telecom user. As an alternative to the assignment of a new user identifier, the temporary user identifier may be used as the permanent user identifier, or may be converted into the permanent user identifier as necessary. In step 160, the user identifier assigned to the new telecom user and the collected call usage data can be stored in the call usage database, or any other suitable database.

On the other hand, if it is determined that the collected call usage data for the new telecom user corresponds (i.e. matches) with the existing call usage data for an existing telecom user, step 170 illustrates that a user identifier corresponding to the matching existing telecom user is assigned or linked to the new telecom user. This finding indicates that the user is a returning customer, and not an actual new customer. In this case, the call usage data can accurately indicate that the new telecom user is in fact the same entity as the existing telecom user based on the call usage data, and therefore, the new telecom user can be correctly identified as the existing matching telecom user within the telecom company system.

These embodiments may be implemented with any suitable hardware and/or software configuration, including, for example, modules executed on computing devices such as computing device 210 of FIG. 2. Embodiments may, for example, execute modules corresponding to steps shown in the methods described herein. Of course, a single step may be performed by more than one module, a single module may perform more than one step, or any other logical division of steps of the methods described herein may be used to implement the processes as software executed on a computing device.

Computing device 210 has one or more processing device 211 designed to process instructions, for example computer readable instructions (i.e., code) stored on a storage device 213. By processing instructions, processing device 211 may perform the steps set forth in the methods described herein. Storage device 213 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 210 additionally has memory 212, an input controller 216, and an output controller 215. A bus 214 operatively couples components of computing device 210, including processor 211, memory 212, storage device 213, input controller 216, output controller 215, and any other devices (e.g., network controllers, sound controllers, etc.). Output controller 215 may be operatively coupled (e.g., via a wired or wireless connection) to a display device 220 (e.g., a monitor, television, mobile device screen, touch-display, etc.) in such a fashion that output controller 215 can transform the display on display device 220 (e.g., in response to modules executed). Input controller 216 may be operatively coupled (e.g., via a wired or wireless connection) to input device 230 (e.g., mouse, keyboard, touch-pad, scroll-ball, touch-display, etc.) in such a fashion that input can be received from a user (e.g., a user may input with an input device 230 a dig ticket).

Of course, FIG. 2 illustrates computing device 210, display device 220, and input device 230 as separate devices for ease of identification only. Computing device 210, display device 220, and input device 230 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 210 may be one or more servers, for example a farm of networked servers, a clustered server environment, or a cloud network of computing devices.

While systems and methods are described herein by way of example and embodiments, those skilled in the art recognize that the systems and methods for identifying telecom users based on call usage patterns are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

Various embodiments of the disclosed embodiment have been disclosed herein. However, various modifications can be made without departing from the scope of the embodiments as defined by the appended claims and legal equivalents.

What is claimed is:

1. A method for identifying telecom users, the method comprising:
   collecting, with a computing device, call usage data based on the call usage of a new telecom user;
   comparing, with a computing device, the collected call usage data with existing call usage data stored within a call usage database to determine if the collected call usage data for the new telecom user corresponds with the existing call usage data for an existing telecom user;
   assigning the new telecom user a user identifier corresponding to the existing telecom user if it is determined that the collected call usage data for the new telecom user corresponds with the existing call usage data for an existing telecom user; and
   assigning the new telecom user a new user identifier if it is determined that the collected call usage data for the new telecom user does not correspond with the existing call usage data for an existing telecom user.

2. The method of claim 1, further comprising storing the collected call usage data for the new telecom user in the call usage database if it is determined that the collected call usage data for the new telecom user does not correspond with the existing call usage data for an existing telecom user.

3. The method of claim 1, further comprising creating a call usage signature for the new telecom user based on the collected call usage data.

4. The method of claim 1, wherein the new telecom user is assigned a temporary user identifier prior to the determination of whether the collected call usage data for the new telecom user corresponds with the existing call usage data for an existing telecom user.

5. The method of claim 1, wherein the call usage data includes at least one of geographic location of callers, telephone numbers called, identity of callers, call frequencies, call durations, what time of day calls were made, what days of the week calls were made, and number of calls made over a period of time.

6. The method of claim 1, wherein the call usage data is filtered to remove extraneous usage data.

7. A system for identifying telecom users, the system comprising:
   a computing device configured to collect call usage data based on the call usage of a new telecom user;
   a computing device configured to compare the collected call usage data with existing call usage data stored within a call usage database to determine if the collected call usage data for the new telecom user corresponds with the existing call usage data for an existing telecom user;
   a computing device configured to assign the new telecom user a user identifier corresponding to the existing telecom user if it is determined that the collected call usage data for the new telecom user corresponds with the existing call usage data for an existing telecom user; and
   a computing device configured to assign the new telecom user a new user identifier if it is determined that the collected call usage data for the new telecom user does not correspond with the existing call usage data for an existing telecom user.

8. The system of claim 7, further comprising a computing device configured to store the collected call usage data for the new telecom user in the call usage database if it is determined that the collected call usage data for the new telecom user does not correspond with the existing call usage data for an existing telecom user.

9. The system of claim 7, further comprising a computing device configured to create a call usage signature for the new telecom user based on the collected call usage data.

10. The system of claim 7, wherein the new telecom user is assigned a temporary user identifier prior to the determination of whether the collected call usage data for the new telecom user corresponds with the existing call usage data for an existing telecom user.

11. The system of claim 7, wherein the call usage data includes at least one of geographic location of callers, telephone numbers called, identity of callers, call frequencies, call durations, what time of day calls were made, what days of the week calls were made, and number of calls made over a period of time.

12. The system of claim 7, wherein the call usage data is filtered to remove extraneous usage data.

13. Computer-readable code stored on a computer-readable medium that, when executed by a processor, performs a method for identifying telecom users, the method comprising:

collecting, with a computing device, call usage data based on the call usage of a new telecom user;

comparing, with a computing device, the collected call usage data with existing call usage data stored within a call usage database to determine if the collected call usage data for the new telecom user corresponds with the existing call usage data for an existing telecom user;

assigning the new telecom user a user identifier corresponding to the existing telecom user if it is determined that the collected call usage data for the new telecom user corresponds with the existing call usage data for an existing telecom user; and assigning the new telecom user a new user identifier if it is determined that the collected call usage data for the new telecom user does not correspond with the existing call usage data for an existing telecom user.

14. The computer-readable code of claim 13, wherein the method further comprises storing the collected call usage data for the new telecom user in the call usage database if it is determined that the collected call usage data for the new telecom user does not correspond with the existing call usage data for an existing telecom user.

15. The computer-readable code of claim 13, wherein the method further comprises creating a call usage signature for the new telecom user based on the collected call usage data.

16. The computer-readable code of claim 13, wherein the new telecom user is assigned a temporary user identifier prior to the determination of whether the collected call usage data for the new telecom user corresponds with the existing call usage data for an existing telecom user.

17. The computer-readable code of claim 13, wherein the call usage data includes at least one of geographic location of callers, telephone numbers called, identity of callers, call frequencies, call durations, what time of day calls were made, what days of the week calls were made, and number of calls made over a period of time.

18. The computer-readable code of claim 13, wherein the call usage data is filtered to remove extraneous usage data.

* * * * *